US011924940B2

(12) United States Patent
Huang et al.

(10) Patent No.: US 11,924,940 B2
(45) Date of Patent: Mar. 5, 2024

(54) LIGHTING APPARATUS

(71) Applicant: Star Mount Enterprise Limited, Hong Kong (CN)

(72) Inventors: Xiang Hua Huang, Hong Kong (CN); Shou Cheng Wu, Hong Kong (CN); Aaron O'Brien, Hong Kong (CN)

(73) Assignee: Star Mount Enterprise Limited, Hong Kong (CN)

(*) Notice: Subject to any disclaimer, the term of this patent is extended or adjusted under 35 U.S.C. 154(b) by 140 days.

(21) Appl. No.: 17/561,684

(22) Filed: Dec. 23, 2021

(65) Prior Publication Data

US 2023/0086459 A1 Mar. 23, 2023

(30) Foreign Application Priority Data

Sep. 17, 2021 (CN) ......................... 202122279868.8

(51) Int. Cl.

| | |
|---|---|
| ***H05B 45/30*** | (2020.01) |
| ***F21V 29/67*** | (2015.01) |
| ***F21V 33/00*** | (2006.01) |
| ***H05B 45/40*** | (2020.01) |
| *F21Y 103/33* | (2016.01) |
| *F21Y 115/10* | (2016.01) |

(52) U.S. Cl.

CPC ............. *H05B 45/40* (2020.01); *F21V 29/67* (2015.01); *F21V 33/0088* (2013.01); *H05B 45/30* (2020.01); *F21Y 2103/33* (2016.08); *F21Y 2115/10* (2016.08)

(58) Field of Classification Search

CPC ........ H05B 45/00; H05B 45/20; H05B 45/30; H05B 45/40; F21V 29/67; F21V 23/003; F21V 33/0096; F21V 33/0088

See application file for complete search history.

(56) References Cited

U.S. PATENT DOCUMENTS

| | | | | |
|---|---|---|---|---|
| 4,283,658 A * | 8/1981 | Parker | H05B 47/10 | 315/117 |
| 2015/0009666 A1* | 1/2015 | Keng | F21V 33/0096 | 362/249.02 |
| 2018/0283643 A1* | 10/2018 | Fukui | H05B 47/105 | |

FOREIGN PATENT DOCUMENTS

| | | |
|---|---|---|
| CN | 104377755 | 2/2015 |
| CN | 206092478 | 4/2017 |
| CN | 206341163 | 7/2017 |
| CN | 109538516 | 3/2019 |

(Continued)

OTHER PUBLICATIONS

"International Search Report (Form PCT/ISA/210) of PCT/CN2021/129472," dated Jun. 16, 2022, pp. 1-5.

(Continued)

*Primary Examiner* — Thai Pham
(74) *Attorney, Agent, or Firm* — JCIP GLOBAL INC.

(57) ABSTRACT

The present application provides a lighting apparatus, including a lighting apparatus body and a control circuit built in the lighting apparatus body, where the lighting apparatus body includes a plurality of LED lamps; the control circuit includes a motor drive sub-circuit and an LED drive sub-circuit, and the LED drive sub-circuit is connected to the LED lamps, and configured to provide an LED drive signal for the LED lamps; and the motor drive sub-circuit is configured to be connected to a load motor outside the lighting apparatus body, so as to provide a motor drive signal for the load motor.

9 Claims, 8 Drawing Sheets

(56) References Cited

FOREIGN PATENT DOCUMENTS

| | | | |
|---|---|---|---|
| CN | 209611723 | | 11/2019 |
| CN | 111623285 | | 9/2020 |
| CN | 213334009 | | 6/2021 |
| CN | 213334009 U | * | 6/2021 |
| CN | 113161173 | | 7/2021 |
| JP | 2002124124 | | 4/2002 |

OTHER PUBLICATIONS

"Written Opinion of the International Searching Authority (Form PCT/ISA/237) of PCT/CN2021/129472," dated Jun. 16, 2022, pp. 1-4.

* cited by examiner

LIGHTING APPARATUS

CROSS-REFERENCE TO RELATED APPLICATION

This application claims the priority benefit of China application serial no. 202122279868.8, filed on Sep. 17, 2021. The entirety of the above-mentioned patent application is hereby incorporated by reference herein and made a part of this specification.

TECHNICAL FIELD

The present application relates to the field of lighting, and in particular, to a lighting apparatus.

BACKGROUND

At present, with regard to fans on the market that have functions of lighting and air circulation and are loaded with LED lamps, to simultaneously control the LED lamps and the fans, control circuits are mostly disposed on the fans. Because a fan is usually fixed on a ceiling, a control circuit is usually disposed on a fixed base of the fan and between the fixed base of the fan and the ceiling, when the control circuit is damaged, the entire fan together with the LED lamp needs to be removed from the ceiling to replace or repair the control circuit, causing great inconvenience.

SUMMARY

Based on this situation and against the foregoing problems, it is necessary to provide a lighting apparatus which can be used for lighting and can control a fan.

The present application provides a lighting apparatus, including a lighting apparatus body and a control circuit built in the lighting apparatus body, where the lighting apparatus body includes a plurality of LED lamps; the control circuit includes a motor drive sub-circuit and an LED drive sub-circuit, and the LED drive sub-circuit is connected to the LED lamps, and configured to provide an LED drive signal for the LED lamps; and the motor drive sub-circuit is configured to be connected to a load motor outside the lighting apparatus body, so as to provide a motor drive signal for the load motor.

Preferably, the control circuit further includes a signal receiving sub-circuit and a micro-control sub-circuit, where the signal receiving sub-circuit is connected to the micro-control sub-circuit, and configured to receive a control signal input by a user; and the micro-control sub-circuit is connected to the LED drive sub-circuit and the motor drive sub-circuit, and configured to, based on the control signal, control the LED drive sub-circuit to send the LED drive signal, and/or control the motor drive sub-circuit to send the motor drive signal.

Preferably, the LED drive sub-circuit includes a first resistor, a second resistor, a third resistor, and an LED drive chip, where a first end of the LED drive chip is connected to the micro-control sub-circuit through the first resistor, a second end of the LED drive chip is connected to the micro-control sub-circuit through the second resistor, a third end of the LED drive chip is connected to a power supply and an anode of the LED lamp through the third resistor, and a fourth end of the LED drive chip is connected to a cathode of the LED lamp.

Preferably, the motor drive sub-circuit includes at least two speed-regulating units, where the at least two speed-regulating units correspond to different speed-regulating values, and the at least two speed-regulating units are configured to be connected to the load motor outside the lighting apparatus body, so that the load motor operates at different speeds.

Preferably, a target speed-regulating unit of the at least two speed-regulating units includes a fourth resistor, a fifth resistor, a first diode, a first triode, a first relay, and a first capacitor, where the first relay includes a first inductance coil and a first switch, one end of the fourth resistor is connected to one end of the fifth resistor and the micro-control sub-circuit, the other end of the fourth resistor is connected to a base of the first triode, the other end of the fifth resistor is grounded, a collector of the first triode is connected to an anode of the first diode and one end of the first inductance coil, an emitter of the first triode is grounded, a cathode of the first diode is connected to the other end of the first inductance coil, one end of the first switch is connected to the load motor, the other end of the first switch is connected to one end of the first capacitor, and the other end of the first capacitor is connected to the power supply; the target speed-regulating unit is any one of the at least two speed-regulating units, and capacitance values of first capacitors in different speed-regulating units are different.

Preferably, the motor drive sub-circuit includes a motor steering unit, where one end of the motor steering unit is connected to the load motor, and the other end of the motor steering unit is connected to the micro-control sub-circuit, to control the steering of the load motor.

Preferably, the motor steering unit includes a sixth resistor, a seventh resistor, a second diode, a second triode, and a second relay, where the second relay includes a second inductance coil and a second switch, one end of the sixth resistor is connected to one end of the seventh resistor and the micro-control sub-circuit, the other end of the sixth resistor is connected to a base of the second triode, the other end of the seventh resistor is grounded, a collector of the second triode is connected to an anode of the second diode and one end of the second inductance coil, an emitter of the second triode is grounded, a cathode of the second diode is connected to the other end of the second inductance coil, and the second switch is connected to the load motor.

Preferably, the signal receiving sub-circuit includes an eighth resistor, a ninth resistor, a second capacitor, and a signal receiver, where one end of the second capacitor is grounded, the other end of the second capacitor is connected to one end of the eighth resistor and a first end of the signal receiver, the other end of the eighth resistor is connected to one end of the ninth resistor, and the other end of the ninth resistor is connected to a second end of the signal receiver and the micro-control sub-circuit.

Preferably, the lighting apparatus body includes a mounting base plate, a lamp panel, and a lampshade, where the mounting base plate and the lampshade cover each other to form an accommodating space, and the lamp panel is disposed in the accommodating space and fixed to the mounting base plate; and the plurality of LED lamps and the control circuit are disposed on one side of the lamp panel facing the lampshade.

Preferably, the mounting base plate is provided with a first threading hole, the lamp panel is provided with a second threading hole corresponding to the first threading hole, and the lamp panel is connected to a motor control line connected to the motor drive sub-circuit; and the motor control line, via the first threading hole and the second threading hole, extends to the outside of the lighting apparatus body, and is configured to be connected to the load motor.

The present application provides a lighting apparatus, including a lighting apparatus body and a control circuit built in the lighting apparatus body, where the lighting apparatus body includes a plurality of LED lamps; the control circuit includes a motor drive sub-circuit and an LED drive sub-circuit, and the LED drive sub-circuit is connected to the LED lamps, and configured to provide an LED drive signal for the LED lamps; and the motor drive sub-circuit is configured to be connected to a load motor outside the lighting apparatus body, so as to provide a motor drive signal for the load motor. The lighting apparatus according to the present application is provided with the LED drive sub-circuit and the motor drive sub-circuit. The LED drive sub-circuit is connected to the plurality of LED lamps, and the LED drive sub-circuit controls the plurality of LED lamps to implement lighting; and the motor drive sub-circuit controls the load motor, which can not only implement lighting, but also control the load motor. When the motor drive sub-circuit is connected to a motor of a fan, the fan can be controlled. In addition, the control circuit is disposed in the lighting apparatus, so that the control circuit can be replaced and repaired only by disassembling the lighting apparatus without disassembling the entire fan, making replacement and repair easier.

BRIEF DESCRIPTION OF DRAWINGS

To describe the technical solutions in embodiments of the present application or in the prior art more clearly, the accompanying drawings required in the embodiments or the prior art are briefly described below. Apparently, the accompanying drawings in the following description show merely some embodiments of the present application, and a person of ordinary skill in the art can still derive other accompanying drawings based on the structures shown in these accompanying drawings without creative efforts.

Figure 9:
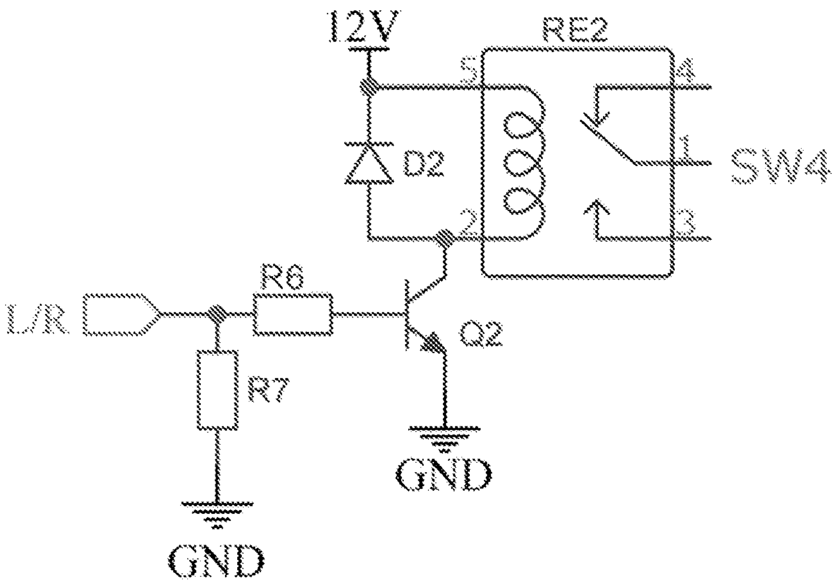
Figure 10:
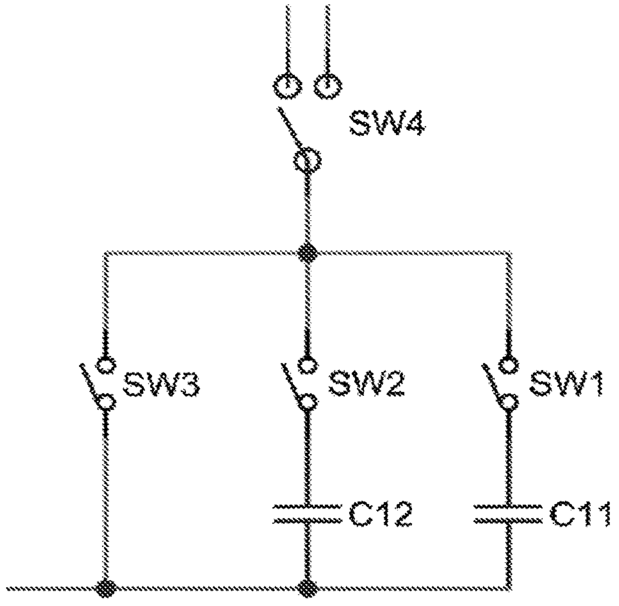
Figure 11:
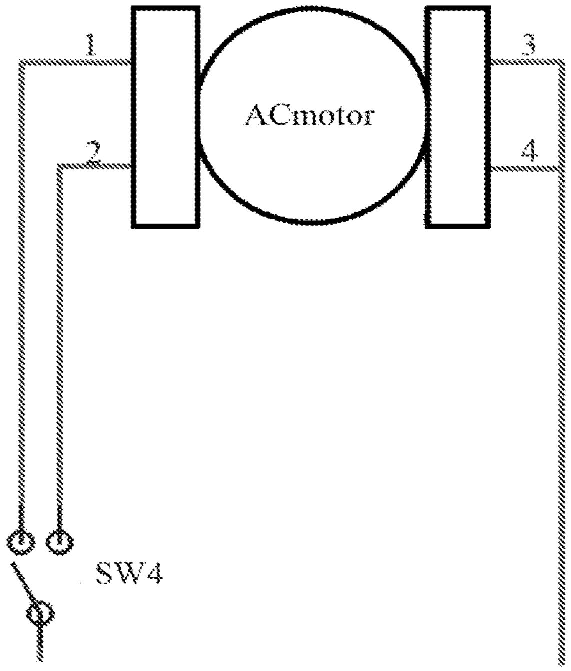
Figure 12:
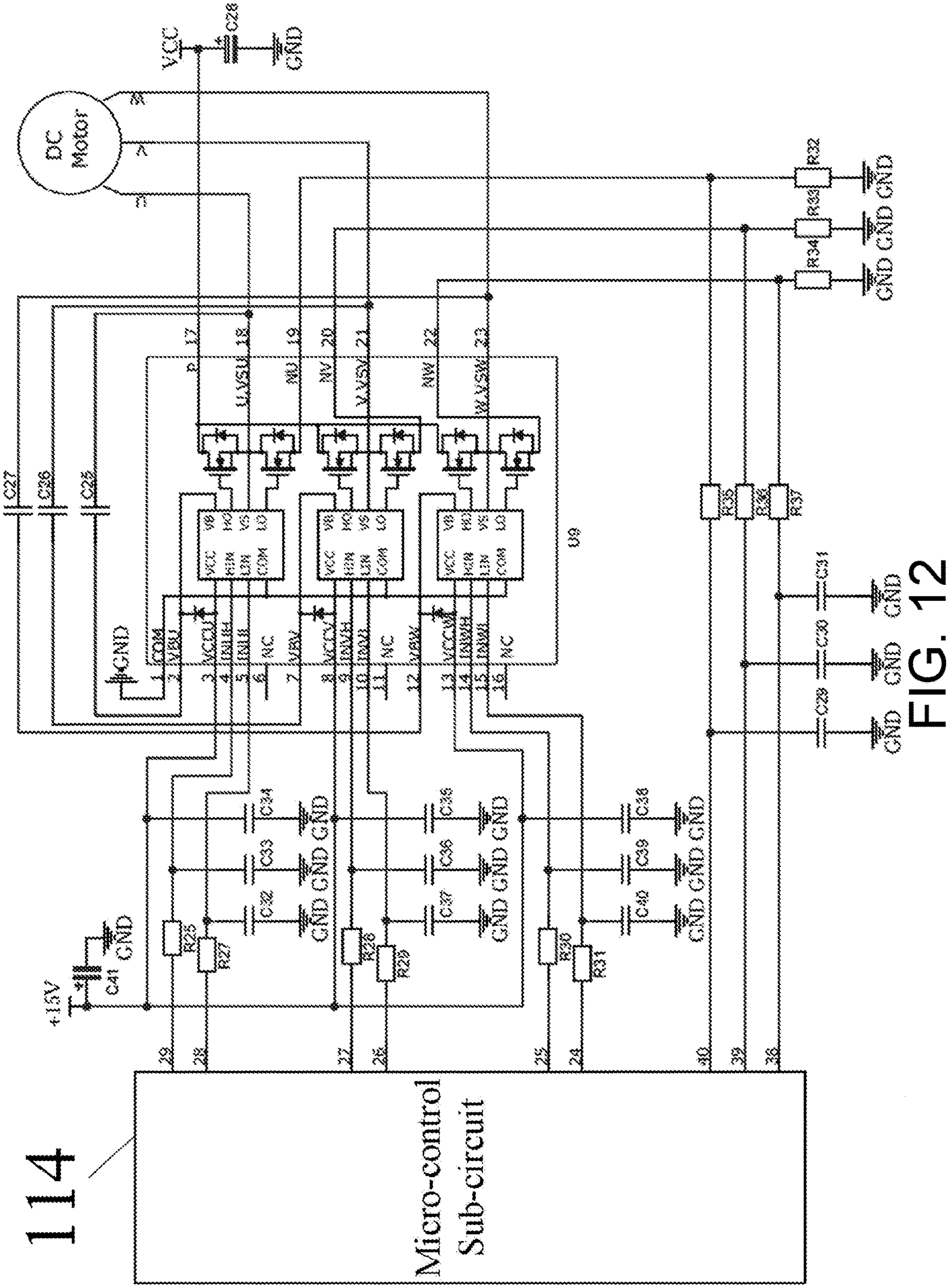

FIG. **8*a*** is a schematic circuit diagram of a lighting apparatus in still another embodiment;

FIG. **8*b*** is a schematic circuit diagram of a lighting apparatus in yet another embodiment;

FIG. 9 is a schematic circuit diagram of a lighting apparatus in still yet another embodiment;

FIG. 10 is a schematic circuit diagram of a lighting apparatus in a further embodiment;

FIG. 11 is a schematic diagram of connection of a load motor in an embodiment; and FIG. 12 is a schematic circuit diagram of a lighting apparatus in a still further embodiment.

DESCRIPTION OF EMBODIMENTS

In an embodiment, to make the objective, technical solutions and advantages of the present application clearer, the following further describes in detail a lighting apparatus according to the present application with reference to FIG. 1 to FIG. 12 and embodiments. Clearly, the described embodiments are some rather than all of the embodiments of the present application. For ease of description, only parts related to the present application are shown in the accompanying drawings.

In the description of the present application, it should be noted that the terms "first" and "second" are merely only used for descriptive purposes and cannot be understood as indicating or implying relative importance.

In the description of the present application, it should be further noted that, unless otherwise specified and defined, the terms "arrange" and "connect" should be understood in a broad sense, for example, a connection may be a fixed connection, or a detachable connection, or an integrated connection; or a mechanical connection, or an electrical connection; or a direct connection, or an indirect connection through an intermediate medium, or internal communication between two elements. For a person of ordinary skill in the art, the specific meanings of the foregoing terms in the present application may be understood based on a specific situation.

Figure 1:
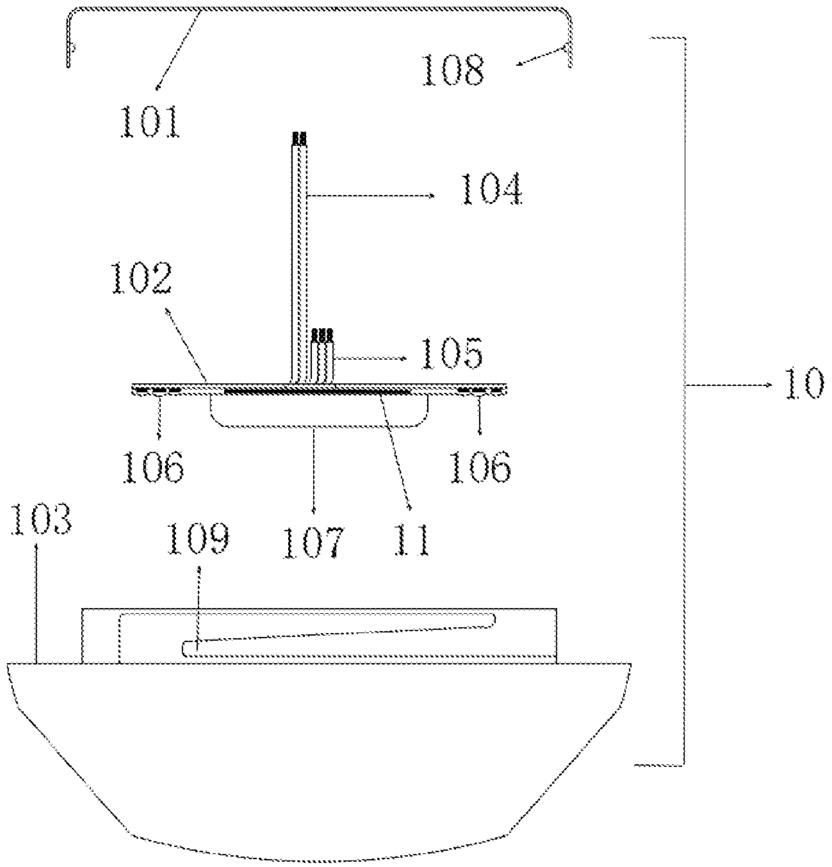
FIG. 1 is a schematic structural diagram of a lighting apparatus in an embodiment.

As shown in FIG. 1, the lighting apparatus according to this embodiment includes a lighting apparatus body 10 and a control circuit 11 built in the lighting apparatus body. The lighting apparatus body 10 includes a mounting base plate 101, a lamp panel 102, and a lampshade 103, where the mounting base plate 101 and the lampshade 103 cover each other to form an accommodating space, and the lamp panel 102 is disposed in the accommodating space and fixed to the mounting base plate 101; and a plurality of LED lamps 106 and the control circuit 11 are disposed on one side of the lamp panel 102 facing the lampshade 103.

In this embodiment, as shown in FIG. 1, the lamp panel 102 is provided with the plurality of LED lamps 106 and the control circuit 11, and further provided with a power line 104 connected to a power supply and a motor control line 105 connected to a load motor. After receiving a control signal sent by a user, the control circuit 11 on the lamp panel 102 controls the plurality of LED lamps 106 and the load motor to operate separately or operate simultaneously.

In this embodiment, as shown in FIG. 1, a protective cover 107 is further provided on one side of the lamp panel 102 facing the lampshade 103. In practical applications, the protective cover 107 may be made of polycarbonate (PC), has high insulation and high light transmittance, and can prevent electric shock when the product is installed or repaired. In addition, infrared rays can penetrate through the protective cover 107, so that the user can control the lighting apparatus through an infrared remote control or another device. Furthermore, a middle part of the protective cover 107 is frosted, so that internal electronic parts cannot be clearly seen, which increases aesthetics.

In this embodiment, as shown in FIG. 1, several protrusions 108 are disposed on an inner side of a side wall of the mounting base plate 101, an outer side of a side wall of the lampshade 103 is provided with a sliding groove 109, and the mounting base plate 101 and the lampshade 103 are connected to each other in a covering manner through the several protrusions 108 and the sliding groove 109.

Figure 2:
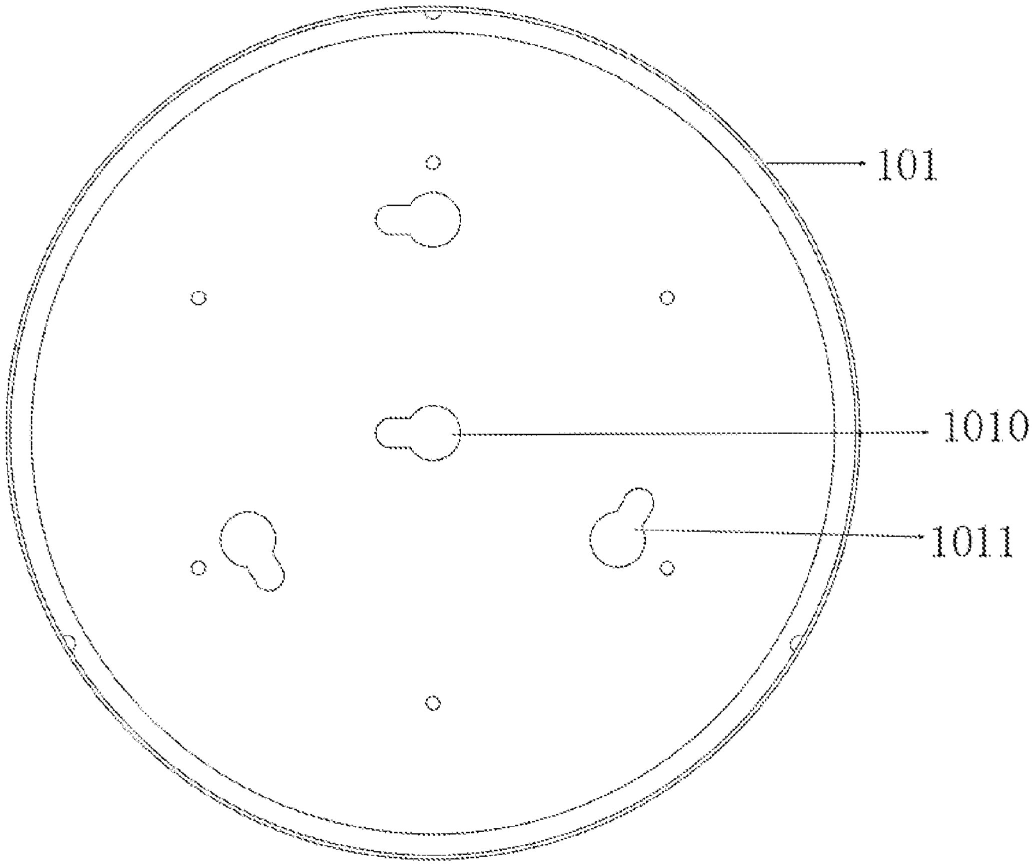
FIG. 2 is a schematic structural diagram of a mounting base plate in an embodiment.
Figure 3:
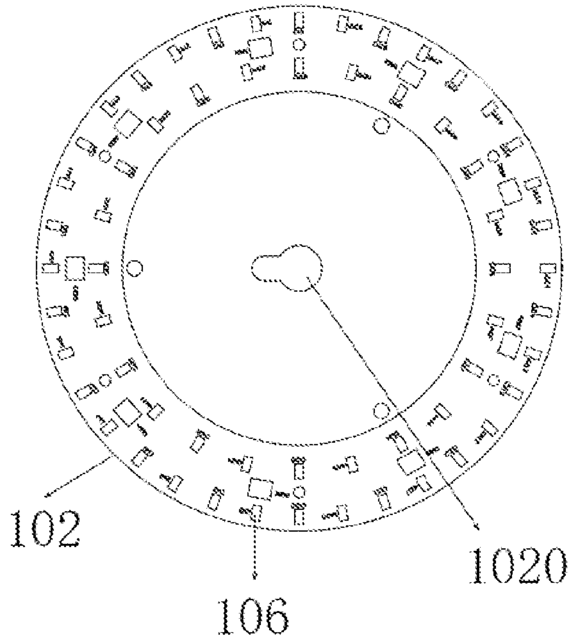
FIG. 3 is a schematic structural diagram of a lamp panel in an embodiment.

In specific embodiments, as shown in FIG. 2 and FIG. 3, the mounting base plate 101 is provided with a first threading hole 1010, the lamp panel 102 is provided with a second threading hole 1020 corresponding to the first threading hole 1010, and the lamp panel 102 is connected to the motor control line 105 connected to a motor drive sub-circuit 111;

and the motor control line 105, via the first threading hole 1010 and the second threading hole 1020, extends to the outside of the lighting apparatus body 10, and is configured to be connected to the load motor.

In this embodiment, a plurality of mounting holes 1011 are further provided around the first threading hole 1010, and may be configured to fix the lighting apparatus to another device or apparatus. For example, the lighting apparatus may be fixed to a fan or a wall. Fixing the lighting apparatus to a fan is used as an example. After the lighting apparatus is fixed to the fan, the lighting apparatus is connected to a fan motor through the motor control line 105, so that the control circuit 11 of the lighting apparatus can drive the fan motor.

Figure 4:
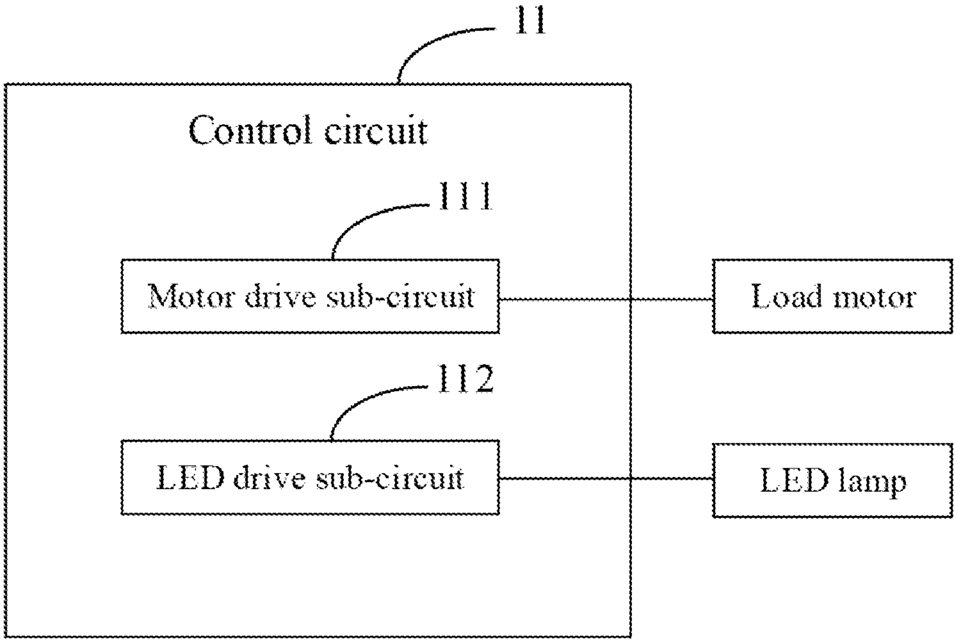
FIG. 4 is a schematic structural diagram of a lighting apparatus in another embodiment.

The lighting apparatus according to this embodiment includes a lighting apparatus body 10 and a control circuit 11 built in the lighting apparatus body, where the lighting apparatus body 10 includes a plurality of LED lamps 106. As shown in FIG. 4, the control circuit 11 includes a motor drive sub-circuit 111 and an LED drive sub-circuit 112, and the LED drive sub-circuit 112 is connected to the LED lamps 106, and configured to provide an LED drive signal for the LED lamps 106; and the motor drive sub-circuit 111 is configured to be connected to a load motor outside the lighting apparatus body 10, so as to provide a motor drive signal for the load motor.

In a specific embodiment, the lighting apparatus according to the present application can be mounted on a fan, so that the fan has a lighting function, and the lighting apparatus can further control the fan. Specifically, the LED drive sub-circuit 112 of the control circuit 11 is configured to control the LED lamps 106, and the motor drive sub-circuit 111 is configured to drive the load motor of the fan. In practical applications, the LED drive sub-circuit 112 may be configured to control the LED lamps 106 to be turned on or turned off and adjust the brightness thereof, and the motor drive sub-circuit 111 may be configured to control the load motor to be started or shut off and adjust a speed and steering thereof.

Figure 5:
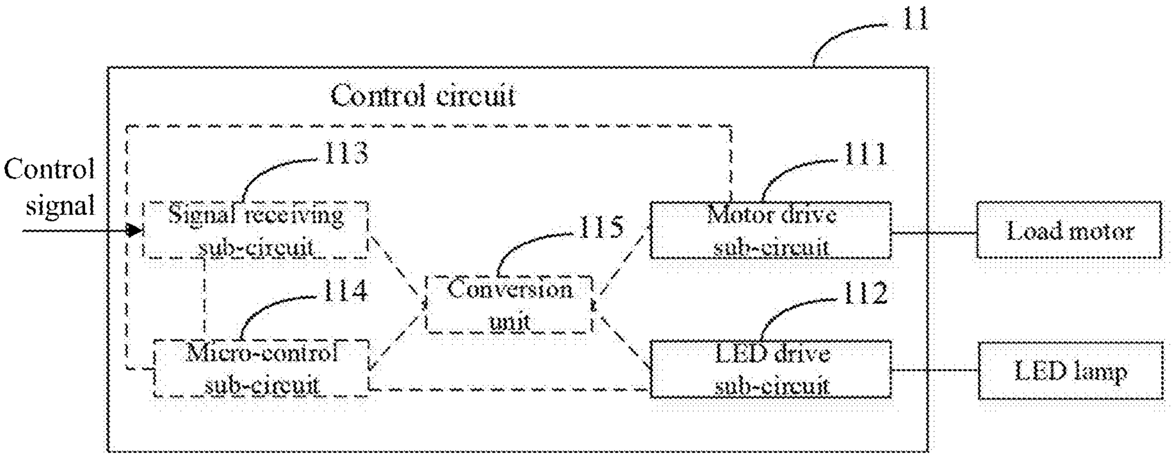
FIG. 5 is a schematic structural diagram of a lighting apparatus in still another embodiment.

In a specific embodiment, as shown in FIG. 5, the control circuit 11 further includes a signal receiving sub-circuit 113 and a micro-control sub-circuit 114, where the signal receiving sub-circuit 113 is connected to the micro-control sub-circuit 114, and configured to receive a control signal input by a user; the signal receiving sub-circuit 113 may be of a plurality of circuit types, including but not limited to a radio receiving circuit, an ultrasonic receiving circuit, a voice receiving circuit, an infrared receiving circuit, a motion sensor, an occupancy sensor, and an optical controller; and the micro-control sub-circuit 114 is connected to the LED drive sub-circuit 112 and the motor drive sub-circuit 111, and configured to, based on the control signal, control the LED drive sub-circuit 112 to send the LED drive signal, and/or control the motor drive sub-circuit 111 to send the motor drive signal.

In a specific embodiment, the signal receiving sub-circuit 113 may be an infrared receiving circuit, which is configured to receive a control signal sent by the user through an infrared remote control or another apparatus. The micro-control sub-circuit 114 may be a radio frequency circuit, and specifically may be a Bluetooth circuit, a Wi-Fi circuit, a ZigBee circuit, or the like. In practical applications, when receiving the control signal sent by the user, the signal receiving sub-circuit 113 sends startup information to the micro-control sub-circuit 114. After receiving the startup information, the micro-control sub-circuit 114 sends a radio frequency signal to the LED drive sub-circuit 112 and/or the motor drive sub-circuit 111, so that the LED drive sub-circuit 112 drives the LED lamps 106 to operate or be turned off, and the motor drive sub-circuit 111 drives the load motor outside the lighting apparatus body 10 to operate or be shut down.

In a specific embodiment, as shown in FIG. 5, the control circuit 11 further includes a conversion unit 115, where one end of the conversion unit 115 is connected to a power supply, and the other end of the conversion unit 115 is connected to the LED drive sub-circuit 112, the motor drive sub-circuit 111, the signal receiving sub-circuit 113, and the micro-control sub-circuit 114. The conversion unit 115 is configured to convert electric energy of the power supply into electric energy suitable for the lighting apparatus, so that the power supply can safely supply power to the lighting apparatus.

In this embodiment, the conversion unit 115 may have a topological structure, which may specifically be a boost topological structure, a buck topological structure, a buck-boost topological structure, an LLC topological structure, a push-pull topological structure, or the like. In practical applications, the conversion unit 115 may be any apparatus that can convert one type of electric energy into another type of electric energy.

Figure 6:
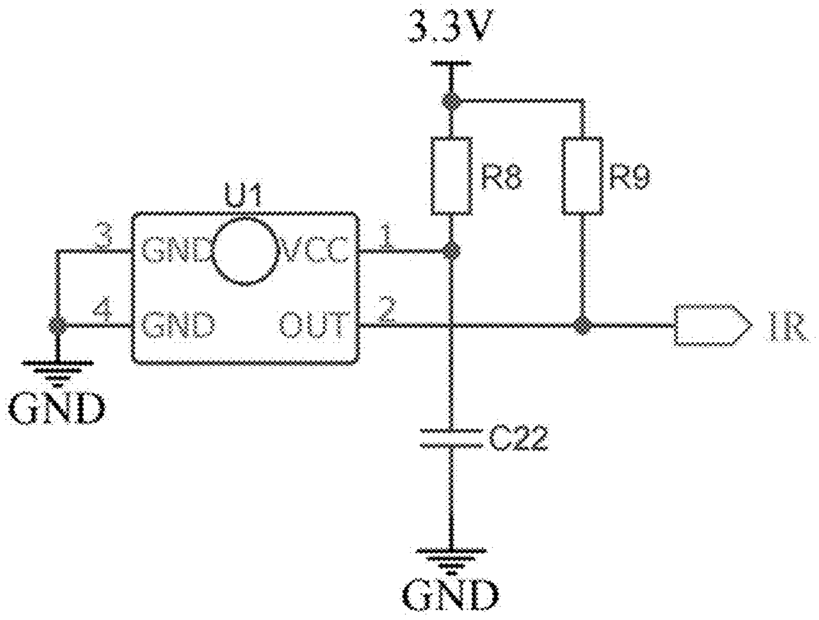
FIG. 6 is a schematic circuit diagram of a lighting apparatus in an embodiment.

In a specific embodiment, as shown in FIG. 6, the signal receiving sub-circuit 113 includes an eighth resistor $R_8$, a ninth resistor $R_9$, a second capacitor $C_{22}$, and a signal receiver $U_1$, where one end of the second capacitor $C_{22}$ is grounded, the other end of the second capacitor $C_{22}$ is connected to one end of the eighth resistor $R_8$ and a first end of the signal receiver $U_1$, the other end of the eighth resistor $R_8$ is connected to one end of the ninth resistor $R_9$, and the other end of the ninth resistor $R_9$ is connected to a second end of the signal receiver $U_1$ and the micro-control sub-circuit 114.

In this embodiment, the eighth resistor $R_8$ and the ninth resistor $R_9$ are simultaneously connected to a 3.3 V power supply. The other end of the ninth resistor $R_9$ and the second end of the signal receiver $U_1$ are connected to the micro-control sub-circuit 114 through an IR interface.

In this embodiment, the signal receiver $U_1$ is an integrated infrared receiving and decoding chip. When an infrared signal emitted by a remote control irradiates a surface of the signal receiver $U_1$, a third end, namely an OUT pin, outputs an infrared coded signal, the signal is sent to the micro-control sub-circuit 114 for processing, and then action of the lighting apparatus is controlled.

In this embodiment, the control circuit 11 is disposed on the lamp panel 102, so that signal receiving antennas of both the signal receiving sub-circuit 113 and the micro-control sub-circuit 114 do not need to be exposed, which facilitates mounting and is more beautiful.

Figure 7:
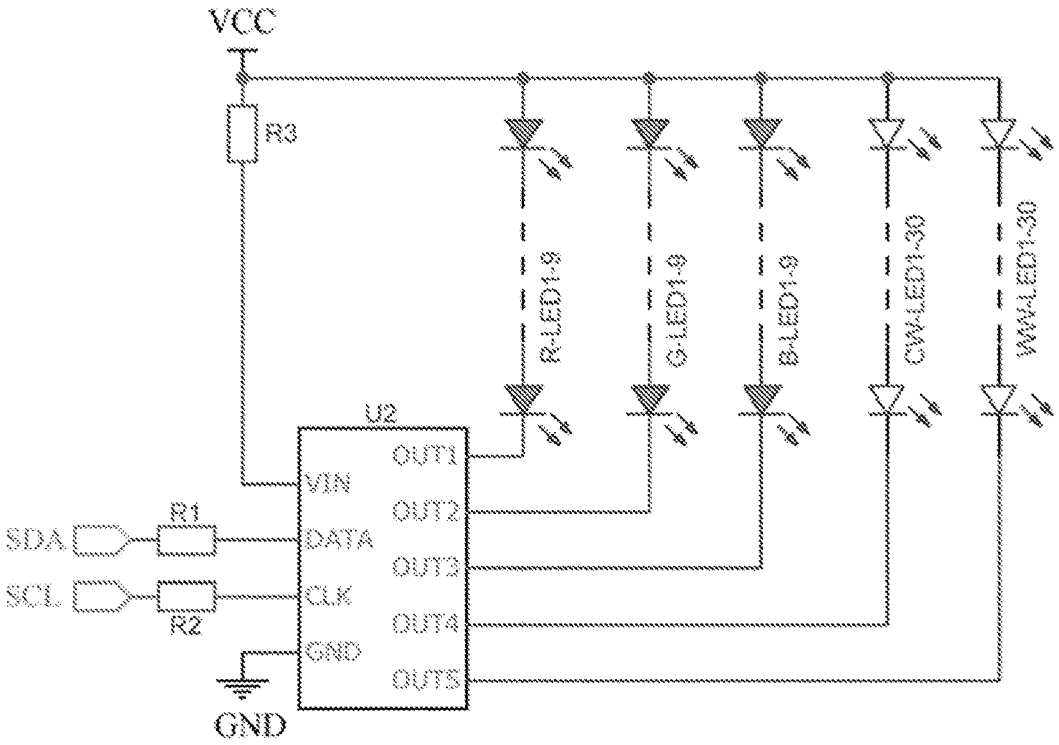
FIG. 7 is a schematic circuit diagram of a lighting apparatus in another embodiment.

In a specific embodiment, as shown in FIG. 7, the LED drive sub-circuit 112 includes a first resistor $R_1$, a second resistor $R_2$, a third resistor $R_3$, and an LED drive chip $U_2$, where a first end of the LED drive chip $U_2$ is connected to the micro-control sub-circuit 114 through the first resistor $R_1$, a second end of the LED drive chip $U_2$ is connected to the micro-control sub-circuit 114 through the second resistor $R_2$, a third end of the LED drive chip $U_2$ is connected to a power supply and an anode of the LED lamp 106 through the third resistor $R_3$, and a fourth end of the LED drive chip $U_2$ is connected to a cathode of the LED lamp 106.

In this embodiment, a fifth end of the LED drive chip $U_2$ is grounded. The first resistor $R_1$ is connected to the micro-control sub-circuit 114 through an SDA interface, and the second resistor $R_2$ is connected to the micro-control sub-circuit 114 through an SCL interface.

In this embodiment, the fourth end of the LED drive chip $U_2$ is an output end, and includes a plurality of OUT output interfaces, and the LED lamps form a plurality of LED lamp groups. The LED lamps 106 in each LED lamp group may be connected in series, in parallel or in series and parallel. Each OUT output interface of the LED drive chip $U_2$ is connected to a cathode of the LED lamp group.

In this embodiment, the plurality of LED lamp groups may have different colors and different brightness. Through control over the plurality of LED lamp groups, a light color, light brightness, cold light, warm light, and the like of the lighting apparatus can be adjusted. It can be understood that in practical applications, the plurality of LED lamps 106 of each LED lamp group may also have different colors and different brightness.

In a specific embodiment, the motor drive sub-circuit 111 includes at least two speed-regulating units, where the at least two speed-regulating units correspond to different speed-regulating values, and the at least two speed-regulating units are configured to be connected to the load motor outside the lighting apparatus body 10, so that the load motor operates at different speeds.

Figure 8A:
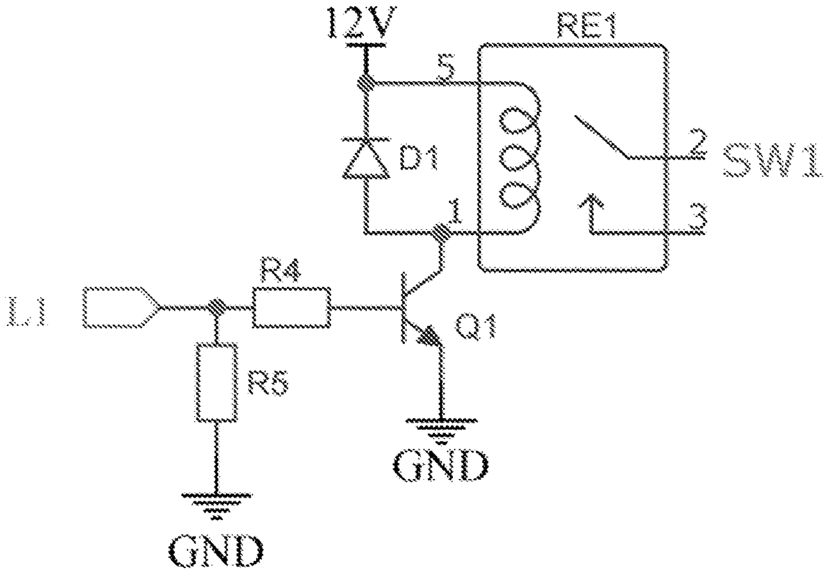
Figure 8B:
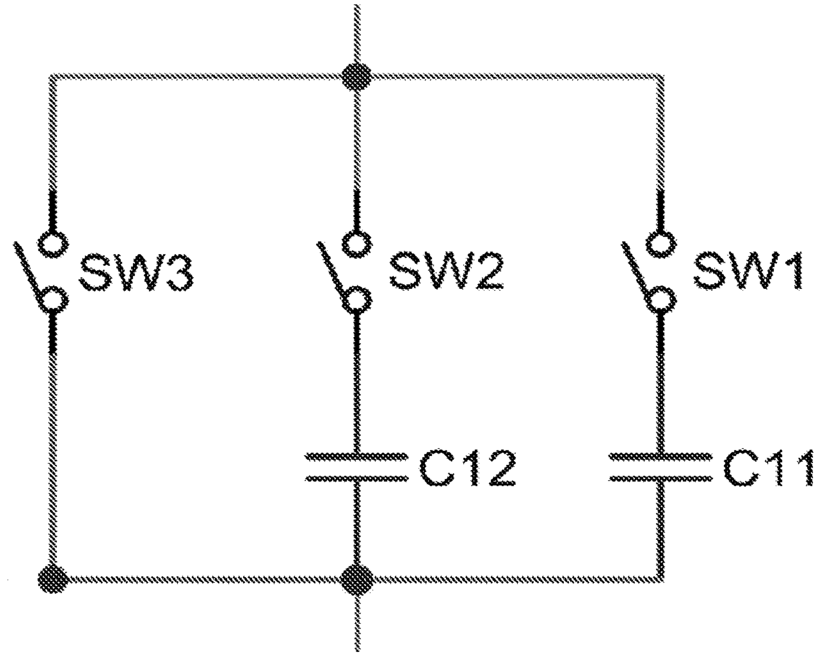

In a specific embodiment, as shown in FIG. 8*a* and FIG. 8*b*, a target speed-regulating unit of the at least two speed-regulating units includes a fourth resistor $R_4$, a fifth resistor $R_5$, a first diode $D_1$, a first triode $Q_1$, a first relay RE1, and a first capacitor C11, where the first relay RE1 includes a first inductance coil and a first switch SW1, one end of the fourth resistor $R_4$ is connected to one end of the fifth resistor $R_5$ and the micro-control sub-circuit 114, the other end of the fourth resistor $R_4$ is connected to a base of the first triode $Q_1$, the other end of the fifth resistor $R_5$ is grounded, a collector of the first triode $Q_1$ is connected to an anode of the first diode $D_1$ and one end of the first inductance coil, an emitter of the first triode $Q_1$ is grounded, a cathode of the first diode $D_1$ is connected to the other end of the first inductance coil, one end of the first switch SW1 is connected to the load motor, the other end of the first switch SW1 is connected to one end of the first capacitor $C_{11}$, and the other end of the first capacitor $C_{11}$ is connected to the power supply; the target speed-regulating unit is any one of the at least two speed-regulating units, and capacitance values of first capacitors $C_{11}$ in different speed-regulating units are different.

In this embodiment, the fourth resistor $R_4$ and the fifth resistor $R_5$ are connected to the micro-control sub-circuit 114 through an L1 interface.

In this embodiment, one of the at least two speed-regulating units may not be provided with a capacitor, which is used to distinguish from the speed-regulating unit provided with the first capacitor $C_{11}$. Specifically, as shown in FIG. 8*b*, a switch SW2 is connected to a capacitor $C_{12}$ having a different capacitance value from the first capacitor $C_{11}$, and a switch SW3 is connected to no capacitor. In practical applications, a capacitor is used in an alternating current circuit to reduce voltage. A smaller capacitance indicates a larger capacitive reactance, a larger voltage drop, and a relatively low motor speed; and a larger capacitance indicates a smaller capacitive reactance, a smaller voltage drop, and a relatively high motor speed. In this embodiment, because of different capacitance values of capacitors connected to three switches in parallel, the load motor speed is different when different switches are turned on.

In a specific embodiment, the motor drive sub-circuit 111 further includes a motor steering unit, where one end of the motor steering unit is connected to the load motor, and the other end of the motor steering unit is connected to the micro-control sub-circuit 114, to control the steering of the load motor.

In a specific embodiment, as shown in FIG. 9, the motor steering unit includes a sixth resistor $R_6$, a seventh resistor $R_7$, a second diode $D_2$, a second triode $Q_2$, and a second relay RE2, where the second relay RE2 includes a second inductance coil and a second switch SW4, one end of the sixth resistor $R_6$ is connected to one end of the seventh resistor $R_7$ and the micro-control sub-circuit 114, the other end of the sixth resistor $R_6$ is connected to a base of the second triode $Q_2$, the other end of the seventh resistor $R_7$ is grounded, a collector of the second triode $Q_2$ is connected to an anode of the second diode $D_2$ and one end of the second inductance coil, an emitter of the second triode $Q_2$ is grounded, a cathode of the second diode $D_2$ is connected to the other end of the second inductance coil, and the second switch SW4 is connected to the load motor.

In this embodiment, the sixth resistor $R_6$ and the seventh resistor $R_7$ are connected to the micro-control sub-circuit 114 through an L/R interface.

In a specific embodiment, one end of the motor steering unit is connected to the load motor, and the other end of the motor steering unit is connected to a speed-regulating unit of the micro-control sub-circuit 114. Specifically, as shown in FIG. 10, the second switch SW4 of the motor steering unit is connected to a first switch SW1 of a target speed-regulating unit.

In this embodiment, as shown in FIG. 11, the second switch SW4 is a single-pole double-throw switch. When the second switch SW4 is connected to pin 1 of an AC motor, the AC motor rotates forward. When the second switch SW4 is connected to pin 2 of the AC motor, the AC motor rotates reversely.

In a specific embodiment, the load motor may alternatively be a DC motor. The lighting apparatus according to the present application may further include a DC motor speed-regulating unit and a DC motor steering unit. One end of the DC motor speed-regulating unit is connected to the micro-control sub-circuit 114, and the other end of the DC motor speed-regulating unit is connected to the load motor, to control a speed of the DC motor. One end of the DC motor steering unit is connected to the micro-control sub-circuit 114, and the other end of the DC motor steering unit is connected to the load motor, to control the steering of the DC motor. In practical applications, the DC motor speed-regulating unit and the DC motor steering unit may be integrated in a power module simultaneously. Specifically, FIG. 12 is a schematic circuit diagram of the power module. The power module includes a chip $U_9$, an input end of the chip $U_9$ is connected to the micro-control sub-circuit 114, and an output end of the chip $U_9$ is connected to the DC motor. A model of the chip $U_9$ is SD05M50DAED.

The lighting apparatus according to the present application is provided with the LED drive sub-circuit 112 and the motor drive sub-circuit 111, and can not only implement lighting, but also control a fan. In addition, the LED drive sub-circuit 112 is connected to a plurality of LED lamp groups, and can adjust a light color, light brightness, cold light, warm light, and the like of the lighting apparatus through control over the plurality of LED lamp groups. Furthermore, the motor drive sub-circuit 111 includes at least two speed-regulating units and one motor steering unit, which are configured to control a speed and steering of a fan motor. The lighting apparatus according to the present application enables the user to adjust the light and the fan based on the user's own requirements and has various functions. Convenience of the fan and the lighting apparatus is improved, and the comfort of the user can be enhanced.

In the lighting apparatus according to the present application, the control circuit is disposed in the lighting apparatus, so that the control circuit can be replaced and repaired only by disassembling the lighting apparatus without disassembling the entire fan, making replacement and repair easier.

Although the present application is described herein with reference to specific implementations, it should be understood that these embodiments are only examples of the principle and applications of the present application. Therefore, it should be understood that many modifications may be made to the example embodiments, and other arrangements may be designed without departing from the spirit and scope of the present application defined by the appended claims. It should be understood that different dependent claims and the features described herein may be combined in a manner different from those described in the original claims. It may be further understood that the features described with reference to a separate embodiment may be used in other described embodiments.

What is claimed is:

1. A lighting apparatus comprising a lighting apparatus body and a control circuit built in the lighting apparatus body, wherein the lighting apparatus body comprises a plurality of light emitting diode (LED) lamps, the control circuit comprises a motor drive sub-circuit and an LED drive sub-circuit, the LED drive sub-circuit is connected to the LED lamps, and configured to provide an LED drive signal for the LED lamps, and the motor drive sub-circuit is configured to be connected to a load motor of a fan outside the lighting apparatus body, so as to provide a motor drive signal for the load motor of the fan, wherein the control circuit further comprises a signal receiving sub-circuit and a micro-control sub-circuit, the signal receiving sub-circuit is connected to the micro-control sub-circuit, and configured to receive a control signal input by a user through a remote control or another apparatus, and send a startup information to the micro-control sub-circuit, and the micro-control sub-circuit is connected to the LED drive sub-circuit and the motor drive sub-circuit, the micro-control sub-circuit, based on the control signal sent by the user, configured to control the LED drive sub circuit and send the LED drive signal to drive the LED lamps, or the micro-control sub-circuit, based on the control signal sent by the user, configured to control the motor drive sub-circuit and send the motor drive signal to drive the load motor of the fan.

2. The lighting apparatus according to claim 1, wherein the LED drive sub-circuit comprises a first resistor, a second resistor, a third resistor, and an LED drive chip, a first end of the LED drive chip is connected to the micro-control sub-circuit through the first resistor, a second end of the LED drive chip is connected to the micro-control sub-circuit through the second resistor, a third end of the LED drive chip is connected to a power supply and an anode of the LED lamp through the third resistor, and a fourth end of the LED drive chip is connected to a cathode of the LED lamp.

3. The lighting apparatus according to claim 1, wherein the motor drive sub-circuit comprises at least two speed-regulating units, the at least two speed-regulating units correspond to different speed-regulating values, and the at least two speed-regulating units are configured to be connected to the load motor outside the lighting apparatus body, so that the load motor operates at different speeds.

4. The lighting apparatus according to claim 3, wherein a target speed-regulating unit of the at least two speed-regulating units comprises a fourth resistor, a fifth resistor, a first diode, a first triode, a first relay, and a first capacitor, the first relay comprises a first inductance coil and a first switch, one end of the fourth resistor is connected to one end of the fifth resistor and the micro-control sub-circuit, the other end of the fourth resistor is connected to a base of the first triode, the other end of the fifth resistor is grounded, a collector of the first triode is connected to an anode of the first diode and one end of the first inductance coil, an emitter of the first triode is grounded, a cathode of the first diode is connected to the other end of the first inductance coil, one end of the first switch is connected to the load motor, the other end of the first switch is connected to one end of the first capacitor, and the other end of the first capacitor is connected to the power supply, the target speed-regulating unit is any one of the at least two speed-regulating units, and capacitance values of first capacitors in different speed-regulating units are different.

5. The lighting apparatus according to claim 1, wherein the motor drive sub-circuit comprises a motor steering unit, one end of the motor steering unit is connected to the load motor, and the other end of the motor steering unit is connected to the micro-control sub-circuit, to control the steering of the load motor.

6. The lighting apparatus according to claim 5, wherein the motor steering unit comprises a sixth resistor, a seventh resistor, a second diode, a second triode, and a second relay, the second relay comprises a second inductance coil and a second switch, one end of the sixth resistor is connected to one end of the seventh resistor and the micro-control sub-circuit, the other end of the sixth resistor is connected to a base of the second triode, the other end of the seventh resistor is grounded, a collector of the second triode is connected to an anode of the second diode and one end of the second inductance coil, an emitter of the second triode is grounded, a cathode of the second diode is connected to the other end of the second inductance coil, and the second switch is connected to the load motor.

7. The lighting apparatus according to claim 1, wherein the signal receiving sub-circuit comprises an eighth resistor, a ninth resistor, a second capacitor, and a signal receiver, one end of the second capacitor is grounded, and the other end of the second capacitor is connected to one end of the eighth resistor and a first end of the signal receiver, the other end of the eighth resistor is connected to one end of the ninth resistor, and the other end of the ninth resistor is connected to a second end of the signal receiver and the micro-control sub-circuit.

8. The lighting apparatus according to claim 1, wherein the lighting apparatus body comprises a mounting base plate, a lamp panel, and a lampshade, the mounting base plate and the lampshade cover each other to form an accommodating space, and the lamp panel is disposed in the accommodating space and fixed to the mounting base plate, and the plurality of LED lamps and the control circuit are disposed on one side of the lamp panel facing the lampshade.

9. The lighting apparatus according to claim 8, wherein the mounting base plate is provided with a first threading hole, the lamp panel is provided with a second threading hole corresponding to the first threading hole, the lamp panel is connected to a motor control line connected to the motor drive sub-circuit, and the motor control line, via the first threading hole and the second threading hole, extends to the outside of the lighting apparatus body, and is configured to be connected to the load motor.

* * * * *